United States Patent Office 3,336,333
Patented Aug. 15, 1967

3,336,333
PROCESS FOR MAKING TERTIARY ALKYL ISO-
THIOCYANATES AND TRITHIANE
William D. Emmons, Huntingdon Valley, Pa., assignor to
Rohm & Haas Company, Philadelphia, Pa., a corporation of Delaware
No Drawing. Filed Nov. 27, 1963, Ser. No. 326,382
10 Claims. (Cl. 260—327)

ABSTRACT OF THE DISCLOSURE

A process of making a tertiary alkyl isothiocyanate of which the tertiary alkyl group contains from four to an average of 24 carbon atoms is disclosed. The process consists of reacting carbon disulfide with a tertiary alkyl azomethine either in the presence or absence of a solvent. The reaction is exothermic and is initiated by gentle heating.

This invention covers a process for making a tertiary alkyl isothiocyanate and/or trithiane which comprises reacting carbon disulfide with a tertiary alkyl azomethine in which the tertiary alkyl group has a carbon content from four to an average of 24 carbon atoms.

In the U.S. Patent 2,955,129 to Mansfield, and in an article in the Journal of Organic Chemistry, volume 24, 1375 (1959), there is described a method for the preparation of tertiary alkyl isothiocyanates which involves treating a tertiary alkyl azomethine with molten sulfur. That process requires relatively high temperatures and is generally accompanied with difficulties in removing the excess sulfur from the reaction mixtures. The present process can proceed under much milder conditions and two useful products can be obtained rather than merely one.

In the tertiary alkyl azomethines which are used in accordance with the invention, the tertiary alkyl group generally has a carbon content from 4 to an average of 24 carbon atoms. Typically these reactants can be represented by the formula

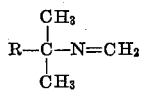

in which R has a carbon content of 1 to an average of 21 carbon atoms. Typical of these tertiaryl alkyl azomethines are t-butyl azomethine, t-octyl azomethine, t-hexyl azomethine, t-dodecyl azomethine and azomethines in which the alkyl group attached to nitrogen is a tertiary alkyl group averaging from 12 to 15 carbon atoms and from 18 to 24 carbon atoms.

In the process of the invention the reaction is exothermic and will proceed at varying speeds depending upon the reactants involved. In general, the reaction will proceed in a temperature range of 0 to 150° C., preferably it is carried out in the temperature range of 50 to 100° C. This is a mild and convenient reaction temperature range.

The reaction of the invention may be run with one mole of carbon disulfide for each mole of tertiary alkyl isothiocyanate. A slight excess of carbon disulfide (10 to 50%) may be employed, but is usually unnecessary.

Optionally, the reaction may be carried out in an inert solvent such as isooctane, cyclohexane, toluene, or xylene and the like.

An advantage of the process is that it can be carried out in the absence of a solvent. It is another advantageous aspect of the invention that the trithiane product slowly precipitates from the solution since trithiane is insoluble in the isothiocyanates which are formed concurrently. The yields of the products are essentially quantitative.

The tertiary alkyl isothiocyanates are useful reactants for proteinaceous materials such as wool and casein to decrease their water-sensitivity. Trithiane is a useful monomer which can be polymerized to a high molecular weight polymer which is extremely solvent-resistant and has fairly good thermal stability.

The following examples are given by way of illustration and are not intended to be limiting in scope of the invention. All parts are by weight.

Example I

There are added 28.2 parts (0.2 mole) of t-octylazomethine to 15.2 parts (0.2 mole) carbon disulfide, and the solution is slowly warmed to 100° C. over a period of two hours. After cooling to room temperature, the slurry which results is suction-filtered giving 8.5 parts (92%) of trithiane. The filtrate is distilled giving 21 parts (88% yield) of t-octylisothiocyanate, B.P. 101–105° C. (20 mm.).

Example II

There are added 17.0 parts (0.2 mole) of t-butylazomethine and 15.2 parts (0.2 mole) carbon disulfide together, and the solution is slowly warmed to 100° C. over a period of two hours. The slurry which results is cooled to room temperature and suction-filtered giving 8.6 parts (94%) of trithiane. The filtrate is distilled giving 19 parts (82% yield) of t-butylisothiocyanate, B.P. 140° C.

Example III

There are added 95.5 parts (0.5 mole) of a tertiary alkyl amine in which the alkyl group has an average of 12 to 15 carbon atoms and 15.0 parts (0.5 mole) of paraformaldehyde to 100 cc. of isooctane. The mixture is refluxed and the water is removed, the solution (which now contains the azomethine) is cooled to room temperature and carbon disulfide, 41.8 parts (0.55 mole) is added.

The solution is heated slowly to 100° C. over a period of three hours. The mixture is cooled and the precipitated trithiane is removed by suction filtration. The residue, obtained after solvent removal, is distilled giving 85 parts of product, B.P. 80 to 103° C. (0.5 mm.). The infrared spectrum of the product shows it to contain little, if any, of the reactants.

Example IV

A tertiary alkyl isothiocyanate in which the alkyl group has an average carbon content of 18 to 24 carbon atoms is prepared following the method of Example III. There is obtained 80 parts of product having a boiling point of 113 to 135° C. (0.3 mm.).

I claim:
1. A process for preparing at least one compound selected from the group consisting of a tertiary alkyl isothiocyanate and trithiane which comprises reacting carbon disulfide with a tertiary alkyl azomethine in which the tertiary alkyl group has a carbon content from four to an average of 24 carbon atoms.

2. The process of claim 1 which comprises reacting carbon disulfide with a tertiary alkyl azomethine of the formula

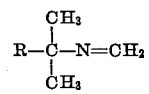

in which R has a carbon content of 1 to an average of 21 carbon atoms.

3. The process of claim 2 in which R is methyl.

4. The process of claim 2 in which R is an alkyl group of five carbon atoms.

5. The process of claim 2 in which R has an average carbon content of 12 to 15.

6. The process of claim 2 in which R has an average carbon content of 18 to 24.

7. The process of claim 1 in which the process is carried out in the presence of an inert solvent.

8. The process of claim 1 in which the process is carried out in the absence of solvent.

9. The process of claim 1 in which the reaction is carried out in the temperature range of 0 to 150° C.

10. The process of claim 8 in which the temperature range is 50 to 100° C.

No references cited.

WALTER A. MODANCE, *Primary Examiner.*

JAMES A. PATTEN, *Examiner.*